(12) United States Patent
Mitsuhashi et al.

(10) Patent No.: US 9,323,002 B2
(45) Date of Patent: Apr. 26, 2016

(54) LIGHT MULTIPLEXER

(75) Inventors: Yuji Mitsuhashi, Yokohama (JP);
Toshiki Nishizawa, Yokohama (JP);
Hiroshi Tomita, Yokohama (JP); Yuzo Ishii, Atsugi (JP); Koichi Hadama, Atsugi (JP)

(73) Assignees: NTT ELECTRONICS CORPORATION, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 533 days.

(21) Appl. No.: 13/055,212

(22) PCT Filed: Jul. 31, 2009

(86) PCT No.: PCT/JP2009/063700
§ 371 (c)(1),
(2), (4) Date: Jan. 21, 2011

(87) PCT Pub. No.: WO2010/018757
PCT Pub. Date: Feb. 18, 2010

(65) Prior Publication Data
US 2011/0129219 A1 Jun. 2, 2011

(30) Foreign Application Priority Data
Aug. 12, 2008 (JP) ................ 2008-207843

(51) Int. Cl.
*G02B 6/293* (2006.01)
*G02B 7/00* (2006.01)
*G02B 27/10* (2006.01)

(52) U.S. Cl.
CPC .......... *G02B 6/2931* (2013.01); *G02B 6/29311* (2013.01); *G02B 7/006* (2013.01); *G02B 7/008* (2013.01); *G02B 27/1006* (2013.01); *G02B 27/1086* (2013.01)

(58) Field of Classification Search
None
See application file for complete search history.

(56) References Cited

U.S. PATENT DOCUMENTS

| 5,035,495 A | 7/1991 | Toyoda et al. |
| 6,384,978 B1 | 5/2002 | Singh et al. |

(Continued)

FOREIGN PATENT DOCUMENTS

| EP | 1074519 A2 | 7/2001 |
| JP | 63-6413 | 1/1988 |

(Continued)

OTHER PUBLICATIONS

Chromospheric/coronal spectra, last updated Aug. 30, 1999, accessed Sep. 19, 2014 from http://www.eso.org/~rfosbury/home/photography/Eclipse99/csp.html.*

(Continued)

*Primary Examiner* — John M Bedtelyon
(74) *Attorney, Agent, or Firm* — Ohlandt Greeley Ruggiero & Perle L.L.P.

(57) ABSTRACT

One side surface of a diffraction grating is securely held by a holder, and further, the holder is securely supported on a substrate by a supporter in such a manner that the diffraction grating held by the holder is not brought into contact with the substrate. In this manner, the diffraction grating is fixed only onto one side surface to the supporter via the holder, and further, the diffraction grating is not brought into contact with the substrate. Therefore, the lower portion of the supporter is displaced by heat generated in the substrate, however, the displacement of the supporter cannot adversely influence directly on the diffraction grating since the holder is interposed between the displaced portion and the diffraction grating.

4 Claims, 10 Drawing Sheets

(56) References Cited

U.S. PATENT DOCUMENTS

| | | | |
|---|---|---|---|
| 6,757,113 B1 * | 6/2004 | Basavanhally et al. | 359/819 |
| 7,609,463 B2 * | 10/2009 | Tsao | 359/811 |
| 2002/0109926 A1 | 8/2002 | Horwitz | |
| 2004/0191637 A1 | 9/2004 | Steckman et al. | |
| 2009/0266967 A1 * | 10/2009 | Allen et al. | 248/512 |

FOREIGN PATENT DOCUMENTS

| | | |
|---|---|---|
| JP | 01-145623 | 6/1989 |
| JP | 03-144406 | 6/1991 |
| JP | 06-331850 | 12/1994 |
| JP | 08-227025 | 9/1996 |
| JP | 09-073020 | 3/1997 |
| JP | 2001033675 | 9/2001 |
| JP | 2004-246130 | 9/2004 |
| JP | 2004-280116 | 10/2004 |
| JP | 2004-309902 | 11/2004 |
| JP | 2005-202046 | 7/2005 |
| JP | 2005-250350 | 9/2005 |
| JP | 2005062239 | 10/2005 |
| WO | WO 0196910 A2 | 12/2001 |
| WO | WO 0239160 A1 | 5/2002 |

OTHER PUBLICATIONS

English machine translation of JP 09-073020.*

European Extended Search Report dated Mar. 27, 2012 for corresponding European Patent Application No. 09806650.9.

Japanese Notification of Decision for Refusal dated Apr. 17, 2012 for corresponding Japanese Patent Application No. 2008-207843 (with English translation).

International Search Report dated Sep. 1, 2009 for corresponding International Patent Application No. PCT/JP2009/063700 (w/ English translation).

Japanese Office Action dated Feb. 7, 2012 for corresponding Japanese Application No. 2008-207843 with English translation.

International Preliminary Report on Patentability for corresponding International Patent Application No. PCT/JP2009/063700 (with English translation).

* cited by examiner

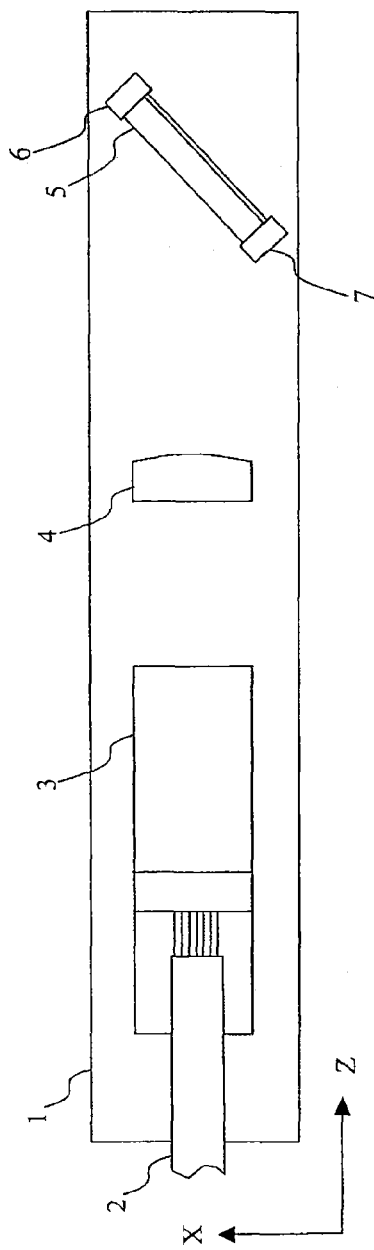
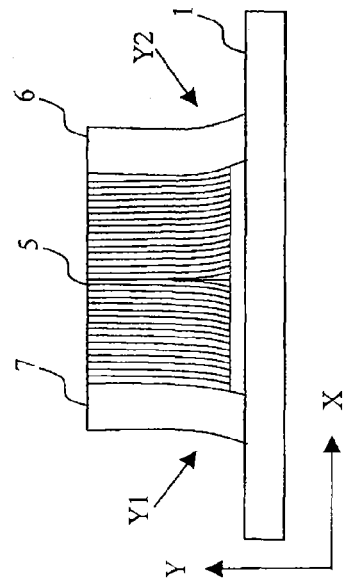
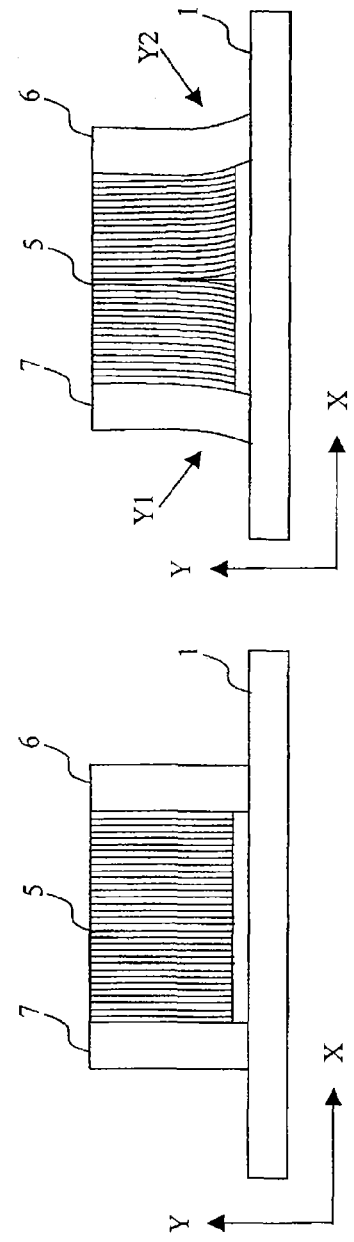
FIG. 1 (a) (PRIOR ART)
FIG. 1 (b) (PRIOR ART)
FIG. 1 (c) (PRIOR ART)

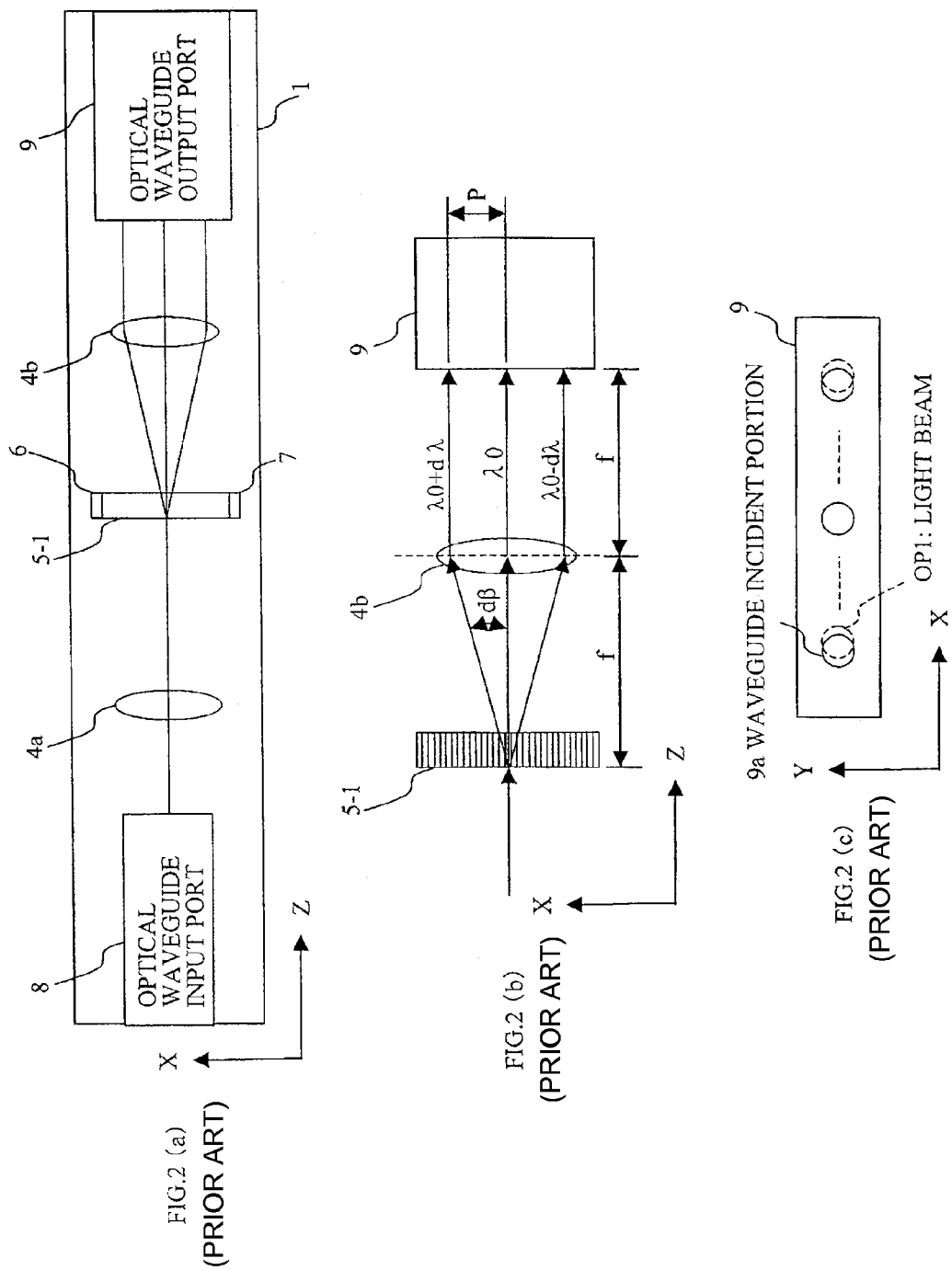
FIG.2 (a) (PRIOR ART)
FIG.2 (b) (PRIOR ART)
FIG.2 (c) (PRIOR ART)

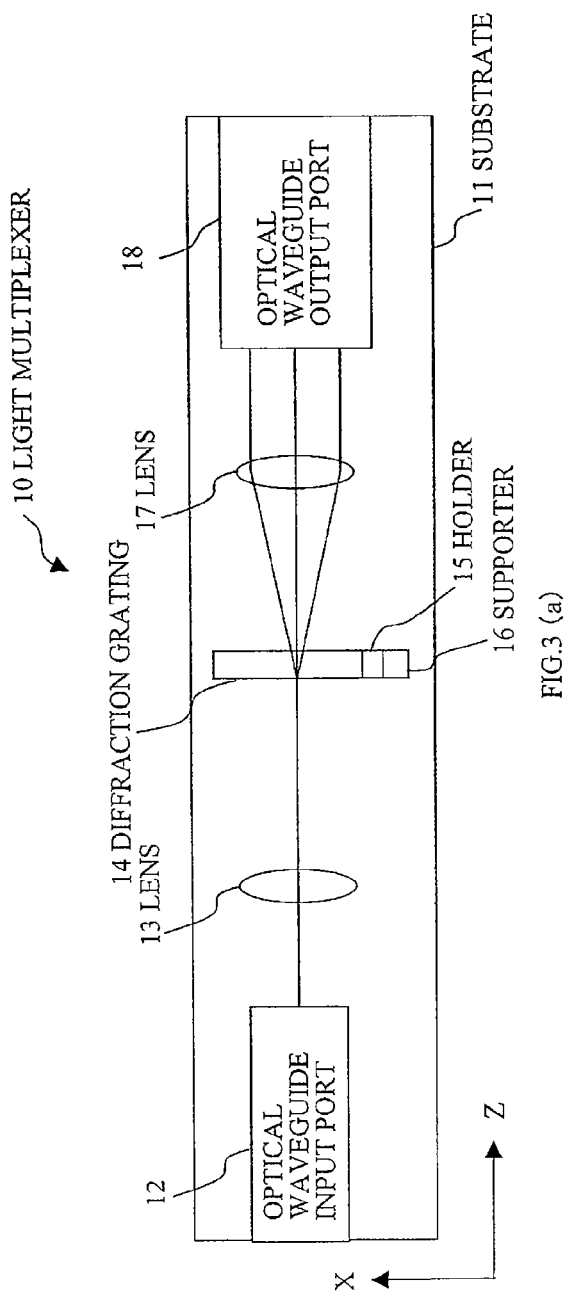
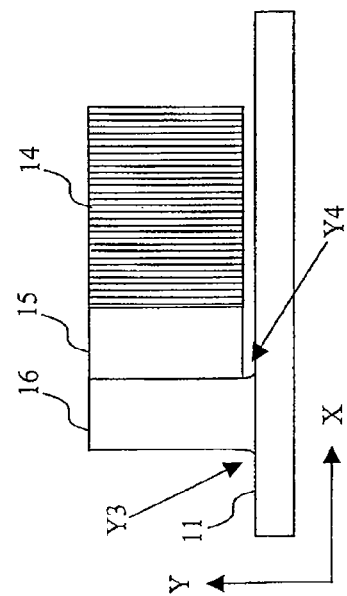
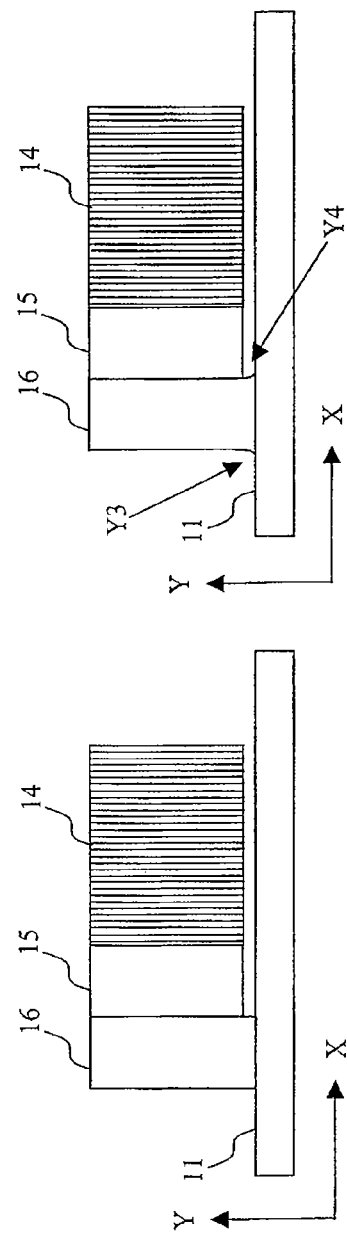
FIG.3 (a)
FIG.3 (b)
FIG.3 (c)

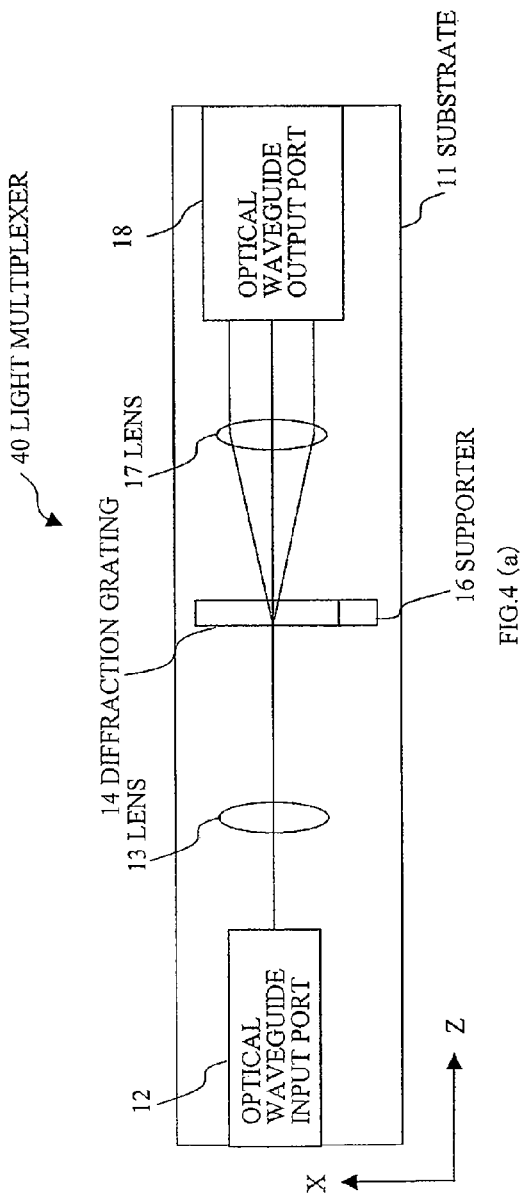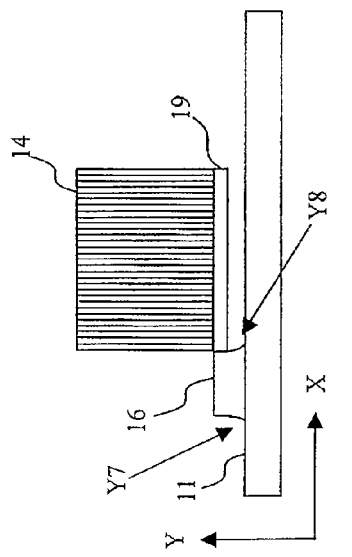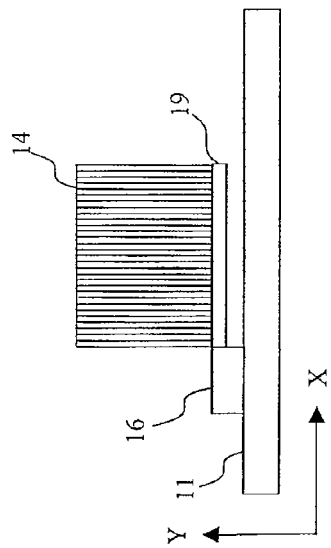

FIG.7

| | DIFFRACTION GRATING PER SE | SHAPE IN RELATED ART | SHAPE IN EMBODIMENT |
|---|---|---|---|
| UPPER PORTION | 1.000006 | 1.000077 | 1.000017 |
| MIDDLE PORTION | 1.000004 | 1.000058 | 1.000017 |
| LOWER PORTION | 1.000006 | 1.000199 | 1.000016 |

(μm)

LIGHT MULTIPLEXER

BACKGROUND

1. Field of the Disclosure

The present disclosure relates to a light multiplexer provided with a diffraction grating having a plurality of elongated grooves for reflecting or transmitting a light beam, formed on quartz or the like in parallel to each other and, more particularly, to a light multiplexer capable of preventing a grating pitch in a diffraction grating from being changed due to a change in temperature.

2. Discussion of the Background Art

A light multiplexer has a diffraction grating having numerous vertical grooves regularly arranged on a glass substrate in parallel to each other. When light beams are incident into the diffraction grating, the transmitted or reflected light beams are diffracted and interfere with each other, so that only the light beam having a specified wavelength can be taken out. Utilizing this fact, the light multiplexer multiplex or demultiplex the light beams. Here, a diffraction grating for reflecting a light beam is referred to as a reflection type whereas a diffraction grating for transmitting a light beam is referred to as a transmission type.

A light multiplexer in the related art is disclosed in, for example, Japanese Patent Application Laid-Open No. 9-73020. This light multiplexer is of a reflection type. As shown in FIG. 1(a), an optical waveguide array device 3 having an input/output array port 2 disposed at one end thereof, a lens 4, and a diffraction grating 5 are mounted on a substrate 1. The optical axes of the members are adjusted in predetermined states at the time of the mounting. Moreover, as shown in FIG. 1(b), the diffraction grating 5 is formed into a plate, and is securely supported on both sides thereof opposite to each other by rod-like supporters 6 and 7.

In the light multiplexer having the above-described configuration, a light beam emitted from the other side of the optical waveguide array device 3 is guided to the diffraction grating 5 through the lens 4, to be diffracted thereat. The diffracted light beam is incident into the other side of the optical waveguide array device 3 through the lens 4, to be thus multiplexed or demultiplexed.

The diffraction grating 5 used in the light multiplexer in the related art disclosed in Patent Document 1 is mostly made of a glass material such as quartz. In addition, each of the rod-like supporters 6 and 7 for securing the diffraction grating 5 onto the substrate 1 also is made of a glass material having a thermal expansion coefficient approximate to that of the diffraction grating 5. However, the substrate 1 is generally made of metal such as Kovar, and therefore, it has a different thermal expansion coefficient from those of the supporters 6 and 7 mounted directly on the substrate 1 and the diffraction grating 5.

As a consequence, when the temperature of the substrate 1 is increased, a portion of each of the supporters 6 and 7 in contact with or near the upper surface of the substrate 1 is more largely displaced than portions remote therefrom, as indicated by arrows Y1 and Y2 in FIG. 1(c). When each of the supporters 6 and 7 is displaced in such a manner, the diffraction grating 5 secured on both sides thereof to the supporters 6 and 7 also is displaced accordingly. In other words, since a grating pitch also is displaced in an X direction according to the displacement, the diffraction angle of the light beam is changed, thereby raising a problem that the light beam cannot be properly multiplexed or demultiplexed. The diffraction grating 5 is secured on both sides thereof to the supporters 6 and 7, and therefore, it is displaced in association with the displacement of the supporters 6 and 7 on both sides.

The change in diffraction angle caused by the temperature will be further explained with reference to a light multiplexer in the case where the reflection type diffraction grating 5 shown in FIGS. 1(a) to 1(c) is replaced by a transmission type diffraction grating 5-1 shown in FIG. 2(a). Here, only a center axis of an optical flux is indicated by a straight line between an optical waveguide input port 8 and the diffraction grating 5-1.

A light beam emitted from an optical waveguide input port 8 is transmitted to the diffraction grating 5-1 through a lens 4a, to be demultiplexed in an X direction at a predetermined wavelength interval by diffraction at the time of the transmission. The demultiplexed light beams are incident into another lens 4b at predetermined diffraction angles. Optical axes are refracted at an angle perpendicular to a waveguide forming end face of an optical waveguide output port 9 by the lens 4b, and then, the light beams are focused on the optical waveguide output port 9.

Here, when $\alpha$ represents an incident angle into the diffraction grating 5-1 whereas $\beta$ represents a diffraction angle, the diffraction angle $\beta$ is expressed by the following equation (1) according to a diffraction grating equation.

$$d(\sin \alpha + \sin \beta) = m\lambda$$

$$\text{therefore, } \beta = \arcsin(m \cdot \lambda/d - \sin \alpha) \quad (1)$$

where d represents a grating pitch; m, the order of diffraction; and $\lambda$, an optical wavelength.

According to the equation (1), it is found that the change in grating pitch in the diffraction grating 5-1 leads to the change in diffraction angle $\beta$.

In addition, when $\lambda 0$ represents a center wavelength whereas $d\lambda$ represents a wavelength interval, adjacent wavelengths may be designated by $\lambda 0 + d\lambda$ and $\lambda 0 - d\lambda$, as illustrated in FIG. 2(b). In contrast, a light incident interval P into the optical waveguide output port 9 is obtained by the following equation (2) when f represents a focal distance of the lens 4b and $d\beta$ represents a difference in diffraction angle between the adjacent wavelengths:

$$P = \tan(d\beta) \cdot f \quad (2)$$

According to the equation (2), it is found that the change in difference $d\beta$ in diffraction angle changes the light incident interval P. Intrinsically, the light incident interval P is fixed, and therefore, when the difference $d\beta$ in diffraction angle is changed, a focused position OP1 of the light beam emitted from the lens 4b is shifted in the X direction with respect to a waveguide incident portion 9a at the end face of the optical waveguide output port 9, as illustrated in FIG. 2(c), thereby causing a coupling loss. In other words, the change in grating pitch in the diffraction grating 5-1 causes the coupling loss. Consequently, there has arisen a problem that the change in grating pitch in the diffraction grating 5-1 according to the change in temperature increases the coupling loss.

In order to solve the above-described problem, an object of the present disclosure is to reduce the displacement in grating pitch in the diffraction grating according to the change in temperature so as to reduce the change in diffraction angle of the light beam, thus properly multiplexing or demultiplexing the light beam.

SUMMARY

In order to achieve the object, there is provided a light multiplexer including a planar diffraction grating for reflecting or transmitting a light beam emitted from an optical waveguide array device with a plurality of straight gratings formed in parallel to each other so as to diffract it, the diffraction grating being disposed on a substrate, the light multiplexer including: a holder for holding the side of the diffraction grating; and a supporter for securely supporting the holder on the substrate in the state in which the diffraction grating held by the holder is not brought into contact with the substrate.

With this configuration, the diffraction grating is fixed on the side thereof to the supporter via the holder, and further, the heat generated in the substrate is conducted directly to only the supporter since the diffraction grating is not brought into contact with the substrate. As a consequence, although the lower portion of the supporter is displaced by the heat generated in the substrate, an adverse influence of the displacement of the supporter directly on the diffraction grating is reduced since the holder is interposed between the displaced portion and the diffraction grating. In other words, it is possible to reduce the displacement of the diffraction grating influenced by the heat caused by the increase in temperature of the substrate.

In the light multiplexer according to the present disclosure, the holder is desirably formed into a prism, one side of the diffraction grating being held at one side of the prism.

With this configuration, the diffraction grating is configured such that it is held by the holder formed into the simple shape, thereby reducing a production cost.

In the light multiplexer according to the present disclosure, desirably the holder is formed into an L shape having an inner corner obtained by welding a bottom parallel to the upper surface of the substrate and a side perpendicular to the bottom at right angles, the diffraction grating is held by the holder in abutment of the corner of the diffraction grating against the L-shaped inner corner, and a portion having the bottom as one of the held surfaces is not brought into contact with the substrate when the supporter supports the holder.

With this configuration, one side and bottom of the diffraction grating are securely held by the balk, thereby firmly fixing the diffraction grating.

In the light multiplexer according to the present disclosure, a countersinking is desirably formed at the inner corner of the L-shaped holder.

With this configuration, when the diffraction grating is held by the holder via an adhesive or soldering, it is possible to prevent a stress from concentrating on the inner corner of the diffraction grating caused by contraction of soldering or the adhesive.

In the light multiplexer according to the present disclosure, the holder is desirably made of the same material as that for the diffraction grating.

With this configuration, since the holder and the diffraction grating have the same sensitiveness to ambient environment, an adverse physical influence such as slight displacement cannot exert on the counterpart.

In the light multiplexer according to the present disclosure, the supporter is desirably made of a material having a thermal expansion coefficient approximate to that of the material for the diffraction grating.

With this configuration, since the thermal expansion coefficient of the supporter becomes more approximate to that of the diffraction grating, the influence on the supporter by the heat of the substrate is hardly exerted on the diffraction grating.

In the light multiplexer according to the present disclosure, desirably the side surface parallel to the grating in the diffraction grating is held in the holder, a side surface of the holder opposite to the held side is supported by the supporter, and the supporter is mounted on the substrate in such a manner that the supported side surface becomes perpendicular to the upper surface of the substrate.

With this configuration, since the diffraction grating is fixed via the holder, the thermal distortion (i.e., displacement caused by heat) generated between the upper surface of the substrate and the held portion hardly influences on the diffraction grating.

In the light multiplexer according to the present disclosure, desirably the bottom perpendicular to the grating in the diffraction grating is held in the holder, a side of the holder perpendicular to the held bottom is supported by the supporter, and the supporter is mounted on the substrate in such a manner that the supported bottom becomes parallel to the upper surface of the substrate.

With this configuration, since the diffraction grating is fixed via the holder, the diffraction grating is hardly influenced by the thermal distortion (i.e., displacement caused by heat) generated between the upper surface of the substrate and the held portion.

According to the present disclosure, it is possible to provide the light multiplexer having a small coupling loss fluctuation in which the displacement in grating pitch in the diffraction grating according to the change in temperature can be reduced so as to reduce the change in diffraction angle of the light beam, thus properly multiplexing or demultiplexing the light beam.

BRIEF DESCRIPTION OF THE DRAWINGS

FIG. 1(a) is a plan view showing the configuration of a light multiplexer of a reflection type in the related art; FIG. 1(b) is a front view showing the configuration of a diffraction grating, a holder, and supporters on a substrate in the light multiplexer; and FIG. 1(c) is a front view showing the displaced state of the supporters caused by a change in temperature.

FIG. 2(a) is a plan view showing the configuration of a light multiplexer of a transmission type in the related art; FIG. 2(b) is a diagram illustrating an optical axis from a diffraction grating to an optical waveguide output port; and FIG. 2(c) is a diagram illustrating a shift between a waveguide incident portion at an end face of the optical waveguide output port and a focused position of the light beam.

FIG. 3(a) is a plan view showing the configuration of a light multiplexer of a transmission type in a first embodiment according to the present disclosure; FIG. 3(b) is a front view showing the configuration of a diffraction grating, a holder, and supporters on a substrate in the light multiplexer; and FIG. 3(c) is a front view showing the displaced state of the supporters caused by a change in temperature.

FIG. 4(a) is a plan view showing the configuration of a light multiplexer of a transmission type in a second embodiment according to the present disclosure; FIG. 4(b) is a front view showing the configuration of a diffraction grating, a holder, and supporters on a substrate in the light multiplexer; and FIG. 4(c) is a front view showing the displaced state of the supporters caused by a change in temperature.

FIG. 7 is a table illustrating the length of a grating pitch resulting from a thermal distortion analysis in each of a diffraction grating per se, a shape in the related art, and a shape in the embodiment.

DETAILED DESCRIPTION OF THE PREFERRED EMBODIMENT

Figure 5:
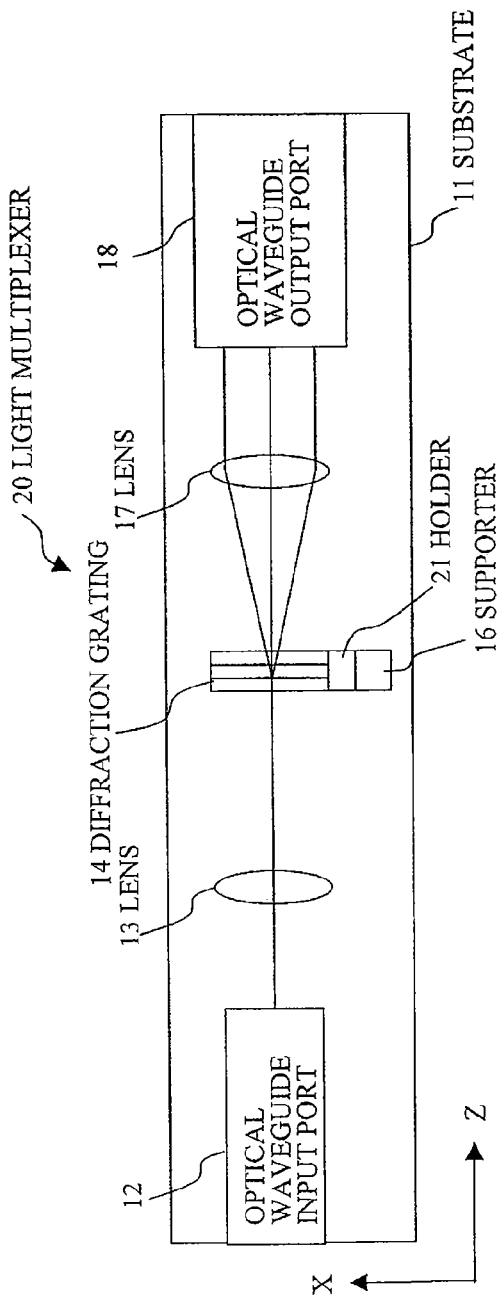
FIG. 5(a) is a plan view showing the configuration of a light multiplexer of a transmission type in a third embodiment according to the present disclosure.
FIG. 5(b) is a front view showing the configuration of a diffraction grating, a holder, and supporters on a substrate in the light multiplexer.
FIG. 5(c) is a perspective view showing the configuration of the diffraction grating, the holder, and the supporters.
Figure 5:
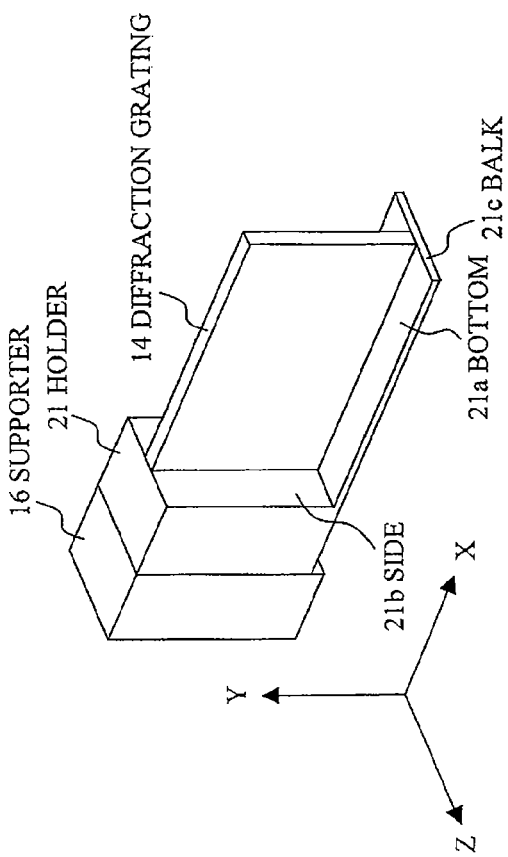
Figure 5:
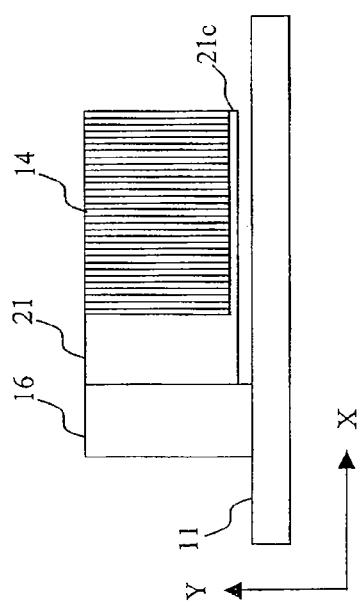

Embodiments according to the present disclosure will be explained with reference to the attached drawings. The embodiments explained below are adapted to embody the present disclosure, and therefore, the present disclosure is not limited to the following embodiments. Here, the same reference numerals in the specification and the drawings mutually represent the same constituent elements.

First Embodiment)

FIG. 3(a) is a plan view showing the configuration of a light multiplexer of a transmission type in an embodiment according to the present invention; FIG. 3(b) is a front view showing the configuration of a diffraction grating, a holder, and supporters on a substrate in the light multiplexer; and FIG. 3(c) is a front view showing the displaced state of the supporters caused by a change in temperature.

As shown in FIGS. 3(a) to 3(c), a light multiplexer 10 includes, on a substrate 11 made of metal such as Kovar, an optical waveguide input port 12 for emitting a light beam guided by an optical fiber, not shown, from the outside, a lens 13, a transmission type diffraction grating 14 having a plurality of grooves formed in vertical stripes in a glass material such as quartz, a prismatic holder 15 for securely holding one side surface of the diffraction grating 14, a prismatic supporter 16 for securely supporting the holder 15 on the substrate 11, another lens 17, and an optical waveguide output port 18, into which the light beam is incident. The optical axes of the elements required for fixing the elements 12, 13, 16, 17, and 18 onto the substrate 11 are adjusted in predetermined states. Here, only the center axes of optical fluxes between the optical waveguide input port 12 and the diffraction grating 14 and between the diffraction grating 14 and the optical waveguide output port 18 are indicated by straight lines.

With the above-described configuration, the light beam emitted from the optical waveguide input port 12 transmitted to the diffraction grating 14 through the lens 13, to be demultiplexed at predetermined wavelength intervals in an X direction owing to the diffraction at the time of the transmission. The demultiplexed light beams are incident into the lens 17 at predetermined diffraction angles. Thereafter, the optical axes are refracted by the lens 17 in such a manner that the light beams are incident into waveguide incident portions at a waveguide forming end face of the optical waveguide output port 18, and thus, the light beams are focused on the optical waveguide output port 18.

The present embodiment is featured in that one side surface of the diffraction grating 14 is securely held in the holder 15, and further, the supporter 16 securely supports the holder 15 on the substrate 11 such that the diffraction grating 14 held in the holder 15 is not brought into contact with the substrate 11.

When the diffraction grating 14 is held in the holder 15, mutual opposite side surfaces of the holder 15 and the diffraction grating 14 are secured to each other via an adhesive or soldering. In the case where the supporter 16 securely supports the holder 15 having the diffraction grating 14 held therein on the substrate 11, first, a surface opposite to the side surface of the holder 15, at which the diffraction grating 14 is held, is fixed via an adhesive or soldering, and thereafter, the optical axes of the diffraction grating 14 and the lenses 13 and 17 are aligned with each other. And then, the supporter 16 is mounted on the upper surface of the substrate 11 via an adhesive or soldering such that the diffraction grating 14 is not brought into contact with the upper surface of the substrate 11.

In this manner, the side surface parallel to the diffraction grating 14 is held in the holder 15, the side surface of the holder 15 opposite to the held side surface is supported by the supporter 16, and further, the supporter 16 is mounted on the substrate 11 such that the supported side surface is perpendicular to the upper surface of the substrate 11.

Here, the diffraction grating 14 is not brought into contact with the substrate 11 in order to prevent any direct conduction of heat from the substrate 11 to the diffraction grating 14. In aligning the optical axes of the diffraction grating 14 and the lenses 13 and 17, the supporter 16 may be first mounted on the substrate 11 by using a mounting jig or the like. The supporter 16 may be mounted by using YAG welding. Moreover, a gap defined between the diffraction grating 14 and the upper surface of the substrate 11 may be 1 mm or more.

In the above-described light multiplexer in the first embodiment, one side surface of the diffraction grating 14 is securely held by the holder 15, and then, the supporter 16 securely supports the holder 15 on the substrate 11 such that the diffraction grating 14 held in the holder 15 is not brought into contact with the substrate 11.

In the conventional configuration, both side surfaces of the diffraction grating are supported on the substrate by the two supporters. As a consequence, when the heat of the substrate is conducted to the supporters on both sides and the supporters are displaced, the diffraction grating is liable to be displaced by the influence of the force of the displacement of the supporters on both sides, resulting in the displacement of the diffraction grating in association with the displacement of the supporters on both sides.

In contrast, in the present embodiment, the diffraction grating 14 is secured to the supporter 16 via the holder 15 at only one side surface thereof. Furthermore, since the diffraction grating 14 is not brought into contact with the substrate 11, the heat of the substrate 11 is directly conducted only to the single supporter 16. Therefore, as indicated by arrows Y3 and Y4 in FIG. 3(c), the lower portion of the supporter 16 is displaced by heat generated in the substrate 11, however, the displacement of the supporter 16 cannot adversely influence directly on the diffraction grating 14 since the holder 15 is interposed between the displaced portion and the diffraction grating 14. In other words, it is possible to reduce the displacement of the diffraction grating 14 by the heat caused by an increase in temperature of the substrate 11.

Additionally, the side surface parallel to the vertical striped gratings in the diffraction grating 14 is held in the holder 15, the side surface of the holder 15 opposite to the held side surface is supported by the supporter 16, and then, the supporter 16 is mounted on the substrate 11 such that the supported side surface is perpendicular to the upper surface of the substrate 11. That is to say, the gratings of the diffraction grating 14 are secured at the upper surface of the substrate 11 via the holder 15 in the perpendicular manner, and therefore, the diffraction grating 14 is hardly influenced by thermal distortion (i.e., displacement caused by the heat) generated between the upper surface of the substrate 11 and the held portion.

Moreover, the gap is defined between the holder 15 and the upper surface of the substrate 11, and therefore, a bimetallic effect produced between the supporter 16 having the holder 15 supported thereby and the upper surface of the substrate 11 cannot influence on the diffraction grating 14, thereby eliminating any adverse influence on the diffraction grating 14.

The holder 15 may be made of the same material as that for the diffraction grating 14. In this case, the holder 15 and the diffraction grating 14 have the same sensitiveness to ambient environment, and therefore, it is possible to prevent any adverse physical influence such as fine displacement on the counterpart.

Alternatively, the supporter 16 may be made of a material having a thermal expansion coefficient approximate to that of the material for the diffraction grating 14. For example, iron-nickel-based material such as Invar may be used. In this case, the thermal expansion coefficient of the supporter 16 becomes more approximate to that of the diffraction grating 14, and therefore, the heat influenced on the supporter 16 from the substrate 11 is hardly transmitted to the diffraction grating 14. Consequently, it is possible to reduce the displacement of the diffraction grating 14 caused by the heat due to the increase in temperature of the substrate 11. Thus, the reduction of the displacement in grating pitch of the diffraction grating caused by the change in temperature can reduce the change in diffraction angle of the light beam, so as to properly multiplex or demultiplex the light beam.

Second Embodiment

FIG. 4(a) is a plan view showing the configuration of a light multiplexer of a transmission type in another embodiment according to the present disclosure; FIG. 4(b) is a front view showing the configuration of a diffraction grating, a holder, and supporters on a substrate in the light multiplexer; and FIG. 4(c) is a front view showing the displaced state of the supporters caused by a change in temperature.

As shown in FIGS. 4(a) to 4(c), a light multiplexer 40 includes, on a substrate 11 made of metal such as Kovar, an optical waveguide input port 12 for emitting a light beam guided by an optical fiber, not shown, from the outside, a lens 13, a transmission type diffraction grating 14 having a plurality of grooves formed in vertical stripes in a glass material such as quartz, a prismatic holder 19 for securely holding the bottom surface of the diffraction grating 14, a prismatic supporter 16 for securely supporting the holder 19 on the substrate 11, another lens 17, and an optical waveguide output port 18, into which the light beam is incident. The optical axes of the elements required for fixing the elements 12, 13, 16, 17, and 18 onto the substrate 11 are adjusted in predetermined states. Here, only the center axes of optical fluxes between the optical waveguide input port 12 and the diffraction grating 14 and between the diffraction grating 14 and the optical waveguide output port 18 are indicated by straight lines.

With the above-described configuration, the light beam emitted from the optical waveguide input port 12 is transmitted to the diffraction grating 14 through the lens 13, to be demultiplexed at predetermined wavelength intervals in an X direction owing to the diffraction at the time of the transmission. The demultiplexed light beams are incident into the lens 17 at predetermined diffraction angles. Thereafter, the optical axes are refracted by the lens 17 in such a manner that the light beams are incident into a waveguide incident portion at a waveguide forming end face of the optical waveguide output port 18, and thus, the light beams are focused on the optical waveguide output port 18.

The present embodiment is featured in that the bottom surface of the diffraction grating 14 is securely held in the holder 19, and then, the supporter 16 securely supports the holder 19 on the substrate 11 such that the diffraction grating 14 held in the holder 19 is not brought into contact with the substrate 11.

When the diffraction grating 14 is held in the holder 19, the upper surface of the holder 19 and the bottom surface of the diffraction grating 14 are secured to each other via an adhesive or soldering. In the case where the supporter 16 securely supports the holder 19 having the diffraction grating 14 held therein on the substrate 11, first, a side surface with respect to the upper surface of the holder 19, at which the diffraction grating 14 is held, is fixed via an adhesive or soldering, and thereafter, the optical axes of the diffraction grating 14 and the lenses 13 and 17 are aligned with each other. And then, the supporter 16 is mounted on the upper surface of the substrate 11 via an adhesive or soldering such that the diffraction grating 14 is not brought into contact with the upper surface of the substrate 11.

In this manner, the bottom surface perpendicular to the diffraction grating 14 is held in the holder 19, the side surface of the holder 19 perpendicular to the held bottom surface is supported by the supporter 16, and further, the supporter 16 is mounted on the substrate 11 such that the supported side surface is perpendicular to the upper surface of the substrate 11.

Here, the diffraction grating 14 is not brought into contact with the substrate 11 in order to prevent any direct conduction of heat from the substrate 11 to the diffraction grating 14. In aligning the optical axes of the diffraction grating 14 and the lenses 13 and 17, the supporter 16 may be first mounted on the substrate 11 by using a mounting jig or the like. The supporter 16 may be mounted by using YAG welding. Moreover, a gap defined between the diffraction grating 14 and the upper surface of the substrate 11 may be 1 mm or more.

In the above-described light multiplexer in the second embodiment, the bottom surface of the diffraction grating 14 is securely held by the holder 19, and then, the supporter 16 securely supports the holder 19 on the substrate 11 such that the diffraction grating 14 held in the holder 19 is not brought into contact with the substrate 11.

In the conventional configuration, both sides surfaces of the diffraction grating are supported on the substrate by the two supporters. As a consequence, when the heat of the substrate is conducted to the supporters on both sides and the supporters are displaced, the diffraction grating is liable to be displaced by the influence of the force of the displacement of the supporters on both sides, resulting in the displacement of the diffraction grating in association with the displacement of the supporters on both sides.

In contrast, in the present embodiment, the diffraction grating 14 is secured to the supporter 16 via the holder 19 at only the bottom surface thereof. Furthermore, since the diffraction grating 14 is not brought into contact with the substrate 11, the heat of the substrate 11 is directly conducted only to the single supporter 16. Therefore, as indicated by arrows Y7 and Y8 in FIG. 4(c), the lower portion of the supporter 16 is displaced by heat generated in the substrate 11, however, the displacement of the supporter 16 cannot adversely influence directly on the diffraction grating 14 since the holder 19 is interposed between the displaced portion and the diffraction grating 14. In other words, it is possible to reduce the displacement of the diffraction grating 14 by the heat caused by an increase in temperature of the substrate 11.

Additionally, the bottom surface perpendicular to the vertical striped gratings in the diffraction grating 14 is held in the holder 19, the side surface of the holder 19 perpendicular to the held bottom surface is supported by the supporter 16, and then, the supporter 16 is mounted on the substrate 11 such that the supported side surface is perpendicular to the upper surface of the substrate 11. That is to say, the gratings of the diffraction grating 14 are secured to the upper surface of the substrate 11 via the holder 19 in the perpendicular manner, and therefore, the diffraction grating 14 is hardly influenced by thermal distortion (i.e., displacement caused by the heat) generated between the upper surface of the substrate 11 and the held portion.

Moreover, the gap is defined between the holder 19 and the upper surface of the substrate 11, and therefore, a bimetallic effect produced between the supporter 16 having the holder 19 supported thereby and the upper surface of the substrate 11 cannot influence on the diffraction grating 14, thereby eliminating any adverse influence on the diffraction grating 14.

The holder 19 may be made of the same material as that for the diffraction grating 14. In this case, the holder 19 and the diffraction grating 14 have the same sensitiveness to ambient environment, and therefore, it is possible to prevent any adverse physical influence such as fine displacement on the counterpart.

Alternatively, the supporter 16 may be made of a material having a thermal expansion coefficient approximate to that of the material for the diffraction grating 14. For example, iron-nickel-based material such as Invar may be used. In this case, the thermal expansion coefficient of the supporter 16 becomes more approximate to that of the diffraction grating 14, and therefore, the heat influenced on the supporter 16 from the substrate 11 is hardly transmitted to the diffraction grating 14. Consequently, it is possible to reduce the displacement of the diffraction grating 14 caused by the heat due to the increase in temperature of the substrate 11. Thus, the reduction of the displacement in grating pitch of the diffraction grating caused by the change in temperature can reduce the change in diffraction angle of the light beam, so as to properly multiplex or demultiplex the light beam.

Third Embodiment

FIG. 5(a) is a plan view showing the configuration of a light multiplexer of a transmission type in a third embodiment according to the present disclosure; FIG. 5(b) is a front view showing the configuration of a diffraction grating, a holder, and supporters on a substrate in the light multiplexer; and FIG. 5(c) is a perspective view showing the configuration of the diffraction grating, the holder, and the supporters.

The difference between a light multiplexer 20 in the third embodiment shown in FIGS. 5(a) to 5(c) and the light multiplexer 10 in the first embodiment resides in an L-shaped holder 21 in place of the holder 15.

Specifically, as shown in FIGS. 5(b) and 5(c), the holder 21 is formed into an L shape, having a bottom 21a parallel to the upper surface of a substrate 11 and a side 21b perpendicular to the bottom 21a, the bottom 21a and the side 21b being welded at an inner corner at right angles. When a diffraction grating 14 is fixed to the holder 21, the corner of the diffraction grating 14 abuts against the inner corner of the holder 21, and then, is fixed to the bottom 21a and the side 21b via an adhesive or soldering.

When a supporter 16 securely supports the holder 21 having the diffraction grating 14 fixed thereto on the substrate 11, first, a surface of the holder 21 opposite to the side 21b, to which the diffraction grating 14 is fixed, is fixed via an adhesive or soldering, and thereafter, the optical axes of the diffraction grating 14 and lenses 13 and 17 are aligned with each other. The supporter 16 is fixed at the upper surface of the substrate 11 via an adhesive or soldering such that a balk 21c including the bottom 21a of the holder 21 is not brought into contact with the upper surface of the substrate 11.

Here, the balk 21c having the diffraction grating 14 fixed thereto cannot be brought into contact with the substrate 11 such that heat of the substrate 11 cannot be conducted directly to the diffraction grating 14 via the balk 21c. In aligning the optical axes of the diffraction grating 14 and the lenses 13 and 17, the supporter 16 may be first mounted on the substrate 11 by using a mounting jig or the like. The supporter 16 may be mounted by using YAG welding. Moreover, a gap defined between the balk 21c of the holder 21 and the upper surface of the substrate 11 may be 1 mm or more.

In the above-described light multiplexer in the third embodiment, the diffraction grating 14 is securely held on the upper surface of the substrate 11 with a gap defined therebetween by using the L-shaped holder 21 in place of the holder 15 in the first embodiment. When the diffraction grating 14 is securely held by the L-shaped holder 21 in this manner, not only one side but also the bottom of the diffraction grating 14 is securely held by the balk 21c. However, the balk 21c is not brought into contact with the upper surface of the substrate 11, and as a result, the same effect as that in the first embodiment can be produced. Moreover, not only one side but also the bottom of the diffraction grating 14 is securely held by the balk 21c, and therefore, the diffraction grating 14 can be more firmly fixed than in the first embodiment.

Also in the third embodiment, the heat of the substrate 11 can be conducted directly to only the supporter 16. The lower portion of the supporter 16 is displaced by heat generated in the substrate 11, however, the displacement of the supporter 16 cannot adversely influence directly on the diffraction grating 14 since the holder 21 is interposed between the displaced portion and the diffraction grating 14, even if the holder 21 is formed into the L shape. In other words, it is possible to reduce the displacement of the diffraction grating 14 caused by the heat due to an increase in temperature of the substrate 11.

Additionally, the gratings of the diffraction grating 14 are secured to the upper surface of the substrate 11 via the holder 21 in the perpendicular manner, and therefore, the diffraction grating 14 is hardly influenced by thermal distortion generated between the upper surface of the substrate 11 and the held portion.

Moreover, the gap is defined between the balk 21c of the holder 21 and the upper surface of the substrate 11, and therefore, a bimetallic effect produced between the supporter 16 having the holder 21 supported thereby and the upper surface of the substrate 11 cannot influence on the diffraction grating 14, thereby eliminating any adverse influence on the diffraction grating 14.

Then, in the manner that the holder 21 may be made of the same material as that for the diffraction grating 14, the holder 21 and the diffraction grating 14 have the same sensitiveness to ambient environment, and therefore, it is possible to prevent any adverse physical influence such as fine displacement on the counterpart.

In addition, in the third embodiment, the diffraction grating 14 is securely held by not only the side 21b of the holder 21 but also the balk 21c thereof, thereby increasing the fixing strength of the diffraction grating 14 so as to reduce misalignment of the optical axis even in long-term use.

Figure 6:
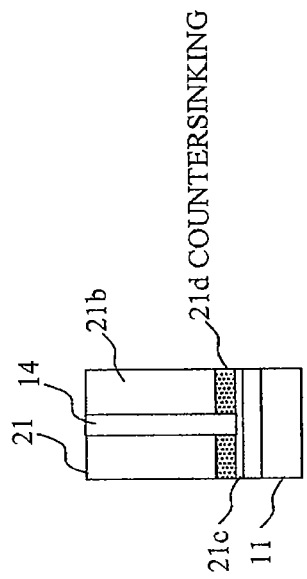
FIG. 6(a) is a front view showing the configuration of a diffraction grating formed into a countersunk L shape in the light multiplexer in the third embodiment.
FIG. 6(b) is a right side view of FIG. 6(a)
FIG. 6(c) is a front view showing the displaced state of the supporters caused by a change in temperature.
Figure 6:
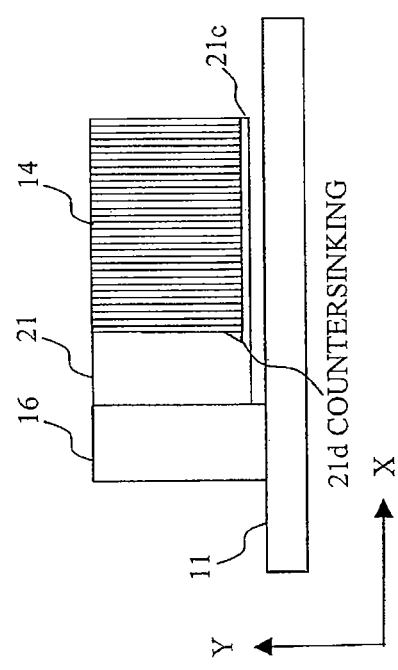
Figure 6:
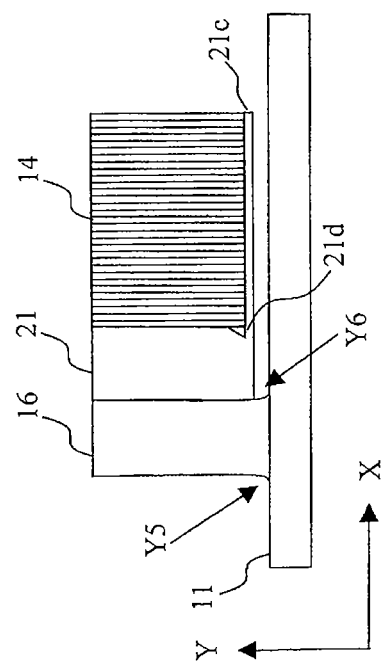

Alternatively, as shown in FIG. 6(a) being a front view and FIG. 6(b) being a right side view of FIG. 6(a), a countersinking 21d may be formed on the corner (i.e., the inner corner) defined between the bottom 21a of the L-shaped holder 21 (see FIG. 5(c)) and the side 21b in a direction perpendicular to vertical striped gratings of the diffraction grating 14. The countersinking 21d is formed into a recessed groove having a triangular cross section in parallel to the bottom 21a along the inner corner of the holder 21.

When the countersinking 21d is formed in the above-described manner, it is possible to prevent concentration of a stress to be exerted on the inner corner of the diffraction grating 14 caused by contraction of soldering or an adhesive in holding the diffraction grating 14 in the holder 21 via the adhesive or soldering. In other words, the countersinking 21d can disperse the stress to be exerted on the inner corner.

Next, explanation will be made on the avoidance effect of the heat generated by an increase in temperature of the substrate 11 with reference to an analysis result.

FIGS. 6(a) and 6(c) show the states of a thermal distortion analysis result of the supporter 16, the holder 21, and the diffraction grating 14 when the upper surface of the substrate 11 had 25° C. and 75° C., respectively. At a temperature of 75° C., the lower portion of the supporter 16 was displaced as indicated by arrows Y5 and Y6. However, no influence on the diffraction grating 14 was observed. That is to say, even if the lower portion of the supporter 16 was displaced, the diffraction grating 14 was not displaced.

Table of FIG. 7 illustrates the length (μm) of a grating pitch obtained by thermal distortion analyses on the shape in the embodiment shown in FIGS. 6(a) to 6(c) and the shape in the related art shown in FIGS. 2(a) to 2(c). The shape in the embodiment indicates the structure in which the diffraction grating 14 is held in the holder 21 with the countersinking 21d, as shown in FIGS. 6(a) to 6(c). In contrast, the shape in the related art indicates the structure in which the diffraction grating 5-1 is supported on both sides thereof by the supporters 6 and 7, as shown in FIGS. 2(a) to 2(c).

Specifically, as shown in FIG. 7, in the case where the distortion is zero and the grating pitch is 1 μm at a temperature of 25° C., displacements of the grating pitch obtained by the thermal distortion analysis are 6 pm at an upper portion of the diffraction grating per se, 4 pm at a middle portion, and 6 pm at a lower portion. Displacements are 77 pm at an upper portion, 58 pm at a middle portion, and 199 pm at a lower portion in the shape in the related art. In contrast, displacements are 17 pm at an upper portion, 17 pm at a middle portion, and 16 pm at a lower portion in the shape in the embodiment.

For comparison, a difference was extracted with reference to the thermal distortion analysis of the diffraction grating per se (a grating pitch displacement of the diffraction grating was assumed as a uniform displacement). Furthermore, assuming that a displacement of a diffraction angle was zero when the upper surface of the substrate 11 had 25° C., the diffraction angle was calculated in accordance with the aforementioned equation (1) with respect to the displacement at a temperature of 70° C.

Figure 8:
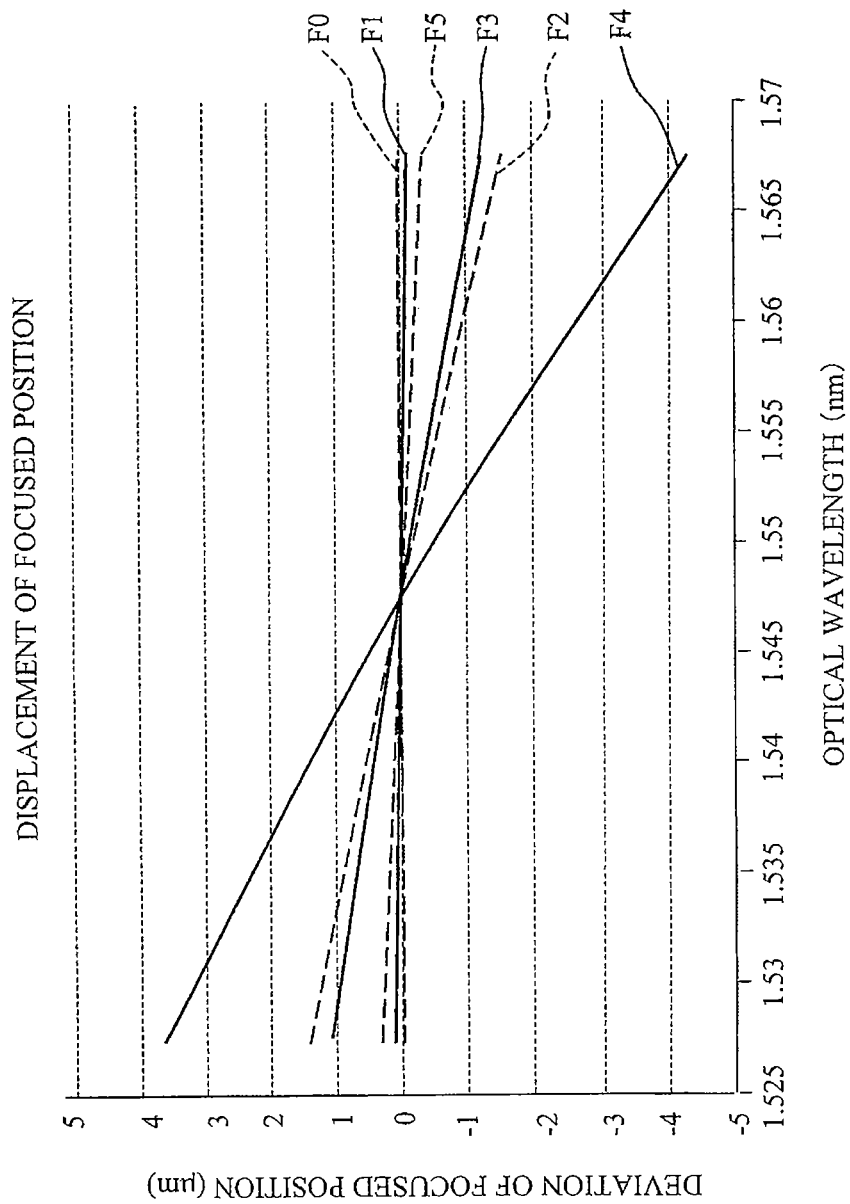
FIG. 8 is a graph illustrating the relationship between the deviation of a focused position and a light wavelength according to a thermal analysis with respect to the shape in the related art and the shape in the embodiment.

In addition, a deviation (μm) of a focused position at the time of using a lens having a focal distance f of 100 mm was obtained in accordance with the aforementioned equation (2). This is illustrated in a graph of FIG. 8 in relation to an optical wavelength (nm). In FIG. 8, a line F0 indicates the relationship between the deviation of the focused position and the optical wavelength at a temperature of 25° C. when the diffraction grating distortion was zero; a line F1, the relationship between the deviation of the focused position and the optical wavelength at a temperature of 70° C. in the diffraction grating per se; a line F2, the relationship between the deviation of the focused position and the optical wavelength at a temperature of 70° C. at the upper portion in the shape in the related art; a line F3, the relationship between the deviation of the focused position and the optical wavelength at a temperature of 70° C. at the middle portion in the shape in the related art; a line F4, the relationship between the deviation of the focused position and the optical wavelength at a temperature of 70° C. at the lower portion in the shape in the related art; and a line F5, the relationship between the deviation of the focused position and the optical wavelength at a temperature of 70° C. in the shape in the embodiment.

Here, the focal distance f was set as sufficiently long as 100 mm so as to secure a crosstalk between the ports. If the focal distance f is reduced, a light beam incident interval P in the optical waveguide output port 18 is reduced in accordance with the aforementioned equation (2), thereby causing degradation of the crosstalk between the ports.

Next, the effect of the shape in the embodiment will be explained below. It is found from Table of FIG. 7 that the grating pitch is largely varied at the lower portion near the substrate in the shape in the related art whereas the grating pitch is hardly varied at the upper, middle, and lower portions in the shape in the embodiment. As a consequence, the displacement of the grating pitch at a temperature of 70° C. can be reduced more than that in the shape in the related art.

Figure 9:
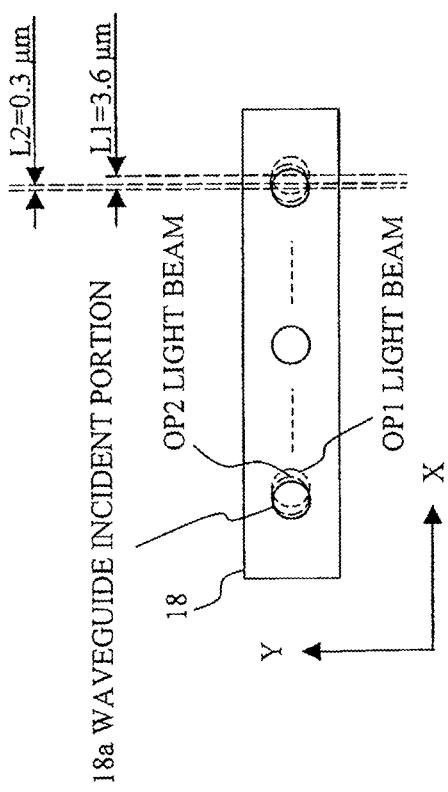
FIG. 9 is a diagram illustrating the deviation of the focused position of the light beam in the embodiment and the related art with respect to the waveguide incident portion at an end face of the optical waveguide output port.

Subsequently, it is found from the graph of FIG. 8 that the thermal displacement of the diffraction grating is reduced in the shape in the embodiment, as indicated by the line F5. This effect will be further described with reference to FIG. 9. In FIG. 9, reference numeral 18a designates a waveguide incident portion at the light beam incident end face of the optical waveguide output port 18; OP1, a focused position of the light beam in the shape in the related art; and OP2, a focused position of the light beam in the shape in the embodiment. A length L1 of a deviation between the center of the waveguide incident portion 18a and the center of the focused position OP1 of the light beam is 3.6 μm, and further, a length L2 of a deviation between the center of the waveguide incident portion 18a and the center of the focused position OP2 of the light beam is 0.3 μm.

As illustrated in FIG. 9, the focused position OP1 of the light beam in the shape in the related art is deviated from the waveguide incident portion 18a by L1 of 3.6 μm: in contrast, the focused position OP2 of the light beam in the shape in the embodiment is deviated only by 0.3 μm. It is obviously found from this value that the thermal displacement of the diffraction grating can be reduced in the shape in the embodiment.

Moreover, in calculating the optical coupling loss at this time, it is about 1.77 dB in the shape in the related art: in contrast, it is as low as about 0.01 dB in the shape in the embodiment. Consequently, the shape in the embodiment can achieve the light multiplexer which is highly resistant against the change in temperature, that is, small in optical loss fluctuation.

Figure 10:
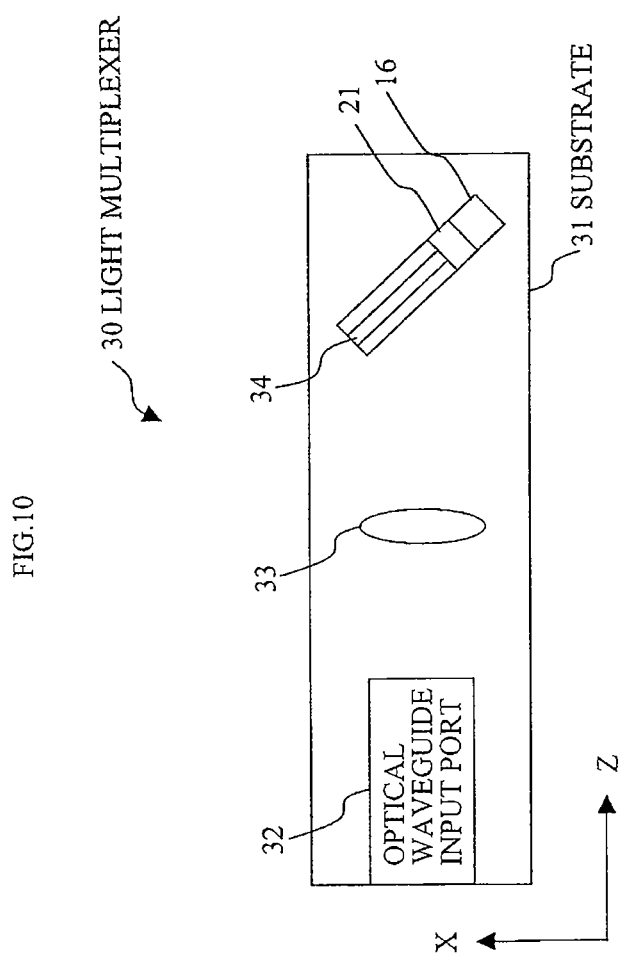
FIG. 10 is a diagram illustrating the configuration of the light multiplexer, in which a reflection type diffraction grating is held in an L-shaped holder in the third embodiment.

Although the diffraction grating 14 is the transmission type light multiplexer in all of the embodiments described above, the same effect as that in the above-described referred embodiments can be produced even by a diffraction grating 34 of a reflection type, like a light multiplexer 30 shown in FIG. 10. The light multiplexer 30 includes, on a substrate 31, an optical waveguide input/output port 32, a lens 33, the diffraction grating 34 of a reflection type having a plurality of grooves formed in vertical stripes on a glass material such as quartz, an L-shaped holder 21 for securely holding one side and bottom of the diffraction grating 34, and a prismatic supporter 16 for securely supporting the holder 21 on the substrate 31.

INDUSTRIAL APPLICABILITY

The light multiplexer according to the present disclosure can be applied to an optical communication network such as a wavelength division multiplexing photonic network for coping with an increase in information communication amount on the Internet.

The invention claimed is:

1. A light multiplexer comprising:
   an optical waveguide array device that emits a light beam along an optical axis;
   a diffraction grating being of a planar form, for reflecting or transmitting the light beam, and having a plurality of straight gratings formed in parallel to each other so as to diffract the light beam;
   a substrate;
   a holder for holding the diffraction grating along a first side of the diffraction grating that is radially offset from the optical axis; and
   a supporter for securely supporting the holder on the substrate in a state in which an empty gap is defined between a bottom surface of the holder and an upper surface of the substrate so that both of the holder and the diffraction grating are not brought into contact with the substrate, to reduce displacement in grating pitch of the diffraction grating caused by a change in temperature of the substrate,
   wherein the diffraction grating has a second side that (a) is perpendicular to the upper surface of the substrate, radially offset from the optical axis, and (b) has no supporter situated thereon,
   wherein the bottom surface of the holder is parallel to the upper surface of the substrate,
   wherein the holder also includes a side perpendicular to the bottom surface, and is thus in a form of an L shape having an inner corner at an intersection of the bottom surface and the side, and
   wherein the diffraction grating has a corner that abuts the inner corner.

2. The light multiplexer of claim 1, wherein the holder has a countersinking at the inner corner.

3. A light multiplexer comprising:
   a port that emits a light beam along an optical axis;
   a diffraction grating being of a planar form, for reflecting or transmitting the light beam, and having a plurality of straight gratings formed in parallel to each other so as to diffract the light beam;
   a substrate;
   a holder for holding the diffraction grating along a first side of the diffraction grating that is radially offset from the optical axis; and
   a supporter for securely supporting the holder on the substrate in a state in which an empty gap is defined between a bottom surface of the holder and an upper surface of the substrate so that both of the holder and the diffraction grating are not brought into contact with the substrate, to reduce displacement in grating pitch of the diffraction grating caused by a change in temperature of the substrate,
   wherein the diffraction grating has a second side that (a) is radially offset from the optical axis, perpendicular to the substrate, and (b) has no supporter situated thereon,
   wherein the bottom surface of the holder is parallel to the upper surface of the substrate,
   wherein the holder also includes a side perpendicular to the bottom surface, and is thus in a form of an L shape having an inner corner at an intersection of the bottom surface and the side, and
   wherein the diffraction grating has a corner that abuts the inner corner.

4. The light multiplexer of claim 3, wherein the holder has a countersinking at the inner corner.

* * * * *